United States Patent [19]

Heath et al.

[11] Patent Number: 5,254,231

[45] Date of Patent: Oct. 19, 1993

[54] METHOD AND APPARATUS FOR CHEMICALLY ALTERING FLUIDS IN CONTINUOUS FLOW

[75] Inventors: William O. Heath; Judson W. Virden, Jr., both of Richland; R. L. Richardson, West Richland; Theresa M. Bergsman, Richland, all of Wash.

[73] Assignee: Battelle Memorial Institute, Richland, Wash.

[21] Appl. No.: 923,769

[22] Filed: Aug. 3, 1992

[51] Int. Cl.⁵ .............................................. H05F 3/00
[52] U.S. Cl. ..................................... 204/164; 204/193
[58] Field of Search ...................... 204/164; 55/2, 10

[56] References Cited

U.S. PATENT DOCUMENTS 4,078,041 3/1978 Morris ........................................ 55/2

OTHER PUBLICATIONS

AC Energized Ferroelectric Pellet Bed Gas Cleaner, Mizuno, et al., IEEE Trans. on Ind. App., vol. 28, No. 3 May/Jun. 1992.

Control of Volatile Organic Compounds by an AC Energized Ferroelectric Pellet Reactor and a Pulsed Corona Reactor, Yamamoto, et al., IEEE Trans. on Ind. App., vol. 28, No. 3, May/Jun. 1992.

Primary Examiner—John Niebling
Assistant Examiner—Brian M. Bolam
Attorney, Agent, or Firm—Paul W. Zimmerman

[57] ABSTRACT

The present invention relates to a continuous flow fluid reactor for chemically altering fluids. The reactor operates on standard frequency (50 to 60 Hz) electricity. The fluid reactor contains particles that are energized by the electricity to form a corona throughout the volume of the reactor and subsequently a non-equilibrium plasma that interacts with the fluid. Particles may form a fixed bed or a fluid bed. Electricity may be provided through electrodes or through an inductive coil. Fluids include gases containing exhaust products and organic fuels requiring oxidation.

22 Claims, 4 Drawing Sheets

METHOD AND APPARATUS FOR CHEMICALLY ALTERING FLUIDS IN CONTINUOUS FLOW

This invention was made with Government support under Contract DE-AC06-76RLO 1830 awarded by the U.S. Department of Energy. The Government has certain rights in the invention.

TECHNICAL FIELD

The present invention relates generally to a method and apparatus for chemically altering chemical constituents in a fluid stream. More specifically, the present invention is the application of electricity to form non-equilibrium plasma to alter chemical constituents. A non-equilibrium plasma is a plasma wherein only electrons are in a very high temperature (high electron energy) and both ions and neutral molecules are in a near-ordinary temperature (low ion/molecule energy).

BACKGROUND OF THE INVENTION

Chemical constituents in fluid streams are altered in many ways, including alteration by application of electrically generated plasmas. Most prior art devices relying on electrically generated plasmas including but not limited to electrostatic particle precipitators, electronic insect killers, and ozonizers, have low efficiencies. Chemical constituents are also altered in reactive beds wherein the beds have small particles that may be fixed or fluid, depending upon the flow rate of the stream, and may be batch or continuous. Fixed beds are those in which the particles are stationary and fluid flows in the interstices between the particles, and fluid beds are those in which the particles are agitated by buoyant forces of a flowing fluid. Depending upon particle size and fluid flow rate, the particles may be fluid or bubbling. When particles are fluid, the net gravitational and buoyant forces on the particles are equal, and there is no net force on the particles permitting them to move about chaotically in a flow stream. The chaotic motion enhances particle-to-particle contact and fluid mixing, as well as enhances heat transfer. When particles are bubbling, there is a net force in the direction of the buoyant force and are carried by the flow stream, causing separation of particles and reduced particle-to-particle contact. Batch reactors are loaded with a charge, then unloaded after processing. Continuous reactors receive an input stream and produce an output stream without needing to reload a charge. Throughout this specification, reactors and reactive beds are of the continuous reactor type.

Often the particles in a reactive bed are a catalytic material, or the particles are inert with an imposed electrical potential. Reactive beds are commonly used to treat contaminated fluids including gases or liquids; for example, air or water. Contaminants include but are not limited to organic compounds, sulfur compounds, and nitrogen compounds, including ammonia, and chlorinated and fluorinated compounds. Contaminated fluids are passed through and interact with the energized bed of particles and undergo chemical change. Chemical change may be a result of chemical or physical interaction of contaminants with the particles, or interaction with a plasma formed near the particles. Nevertheless, contaminants are decomposed into unharmful byproducts, which are then passed out of the reactive bed. Reactive beds are also used to produce useful products in chemical processing.

U.S. Pat. No. 4,954,320 to Birmingham, et al. describes a continuous flow reactive bed that utilizes an "active plasma" wherein the "active plasma" has "a higher energy state than possible with devices comprising the current art" for decomposing contaminant aerosols and gases along with ozone and phosgene. The "active plasma" is created by electricity having a frequency from 0.5 to 40 kHz. Physically, the Birmingham et al. reactive bed contains dielectric particles packed within a container with an imposed electrical potential with gases flowing through interstices between the particles. The particles are static or non-fluidized.

An article entitled THE DESTRUCTION OF VOLATILE ORGANIC COMPOUNDS BY AN INNOVATIVE CORONA TECHNOLOGY, by GH Ramsey, N Plaks, CA Vogel, and WH Ponder of the Air and Energy Engineering Research Laboratory, Environmental Protection Agency (EPA), Research Triangle Park, N.C., and LE Hamel of Acurex Corporation, discloses two corona discharge apparatus. The first is a pulsed corona-induced plasma chemical process that does not contain pellets or particles, and the second is a pelletized bed reactor requiring pellets of very high dielectric constant, for example barium titanate pellets with a dielectric constant of about 6000.

Another article entitled AN ELECTROSTATIC PRECIPITATOR USING PACKED FERROELECTRIC PELLET LAYER FOR DUST COLLECTION, by A Mizuno and H Ito from the Proceedings: Eighth Particulate Control Symposium, Vol. 1 Electrostatic Precipitators, EPRI GS-7050, Nov. 1990, discloses use of 60 Hz electricity to impress an electrical potential across a bed of packed pellets for removal of dust particles from air. In addition to "electrifying" the packed pellets, a direct current corona discharge is used to precharge dust particles prior to their contact with the packed pellets. The article further discloses that, consistent with Ramsey et al., high dielectric pellets are preferred, specifically ferroelectric pellets having dielectric constants greater than 33.

It would be advantageous to achieve the benefits of a reactive bed using lower frequency electricity and most advantageous to use standard 50 to 60 cycle electricity. Further advantages would be realized by using low cost, low dielectric pellets or particles.

The present invention relates to an improved reactive bed and methods for chemically altering fluids.

BRIEF DESCRIPTION OF THE DRAWINGS

Preferred embodiments of this invention are described below with reference to the following accompanying drawings.

DETAILED DESCRIPTION OF THE PREFERRED EMBODIMENTS

Figure 1:
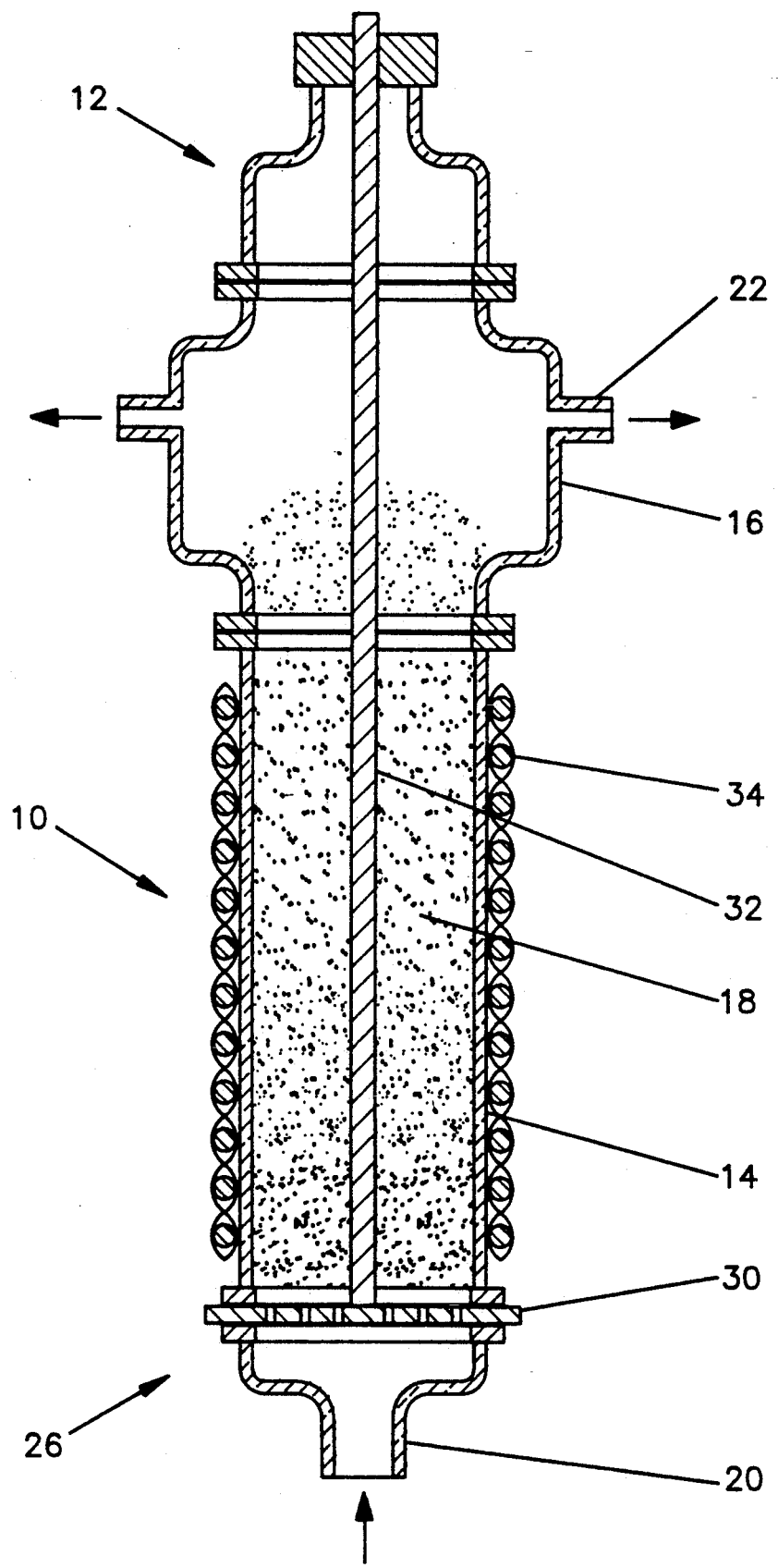
FIG. 1 is a diagrammatical representation of a fluid bed continuous flow reactor in accordance with the present invention.

The present invention is a continuous flow reactive bed utilizing electricity of frequency less than 500 Hz in combination with a bed of particles wherein the particles have a dielectric constant less than 33, to create a non-equilibrium plasma for reacting with chemical constituents in a fluid stream.

The step of creating a non-equilibrium plasma begins with producing an electric field on particle surfaces within a chamber whereby the electric field is effective to create a corona discharge among the particles. Corona discharge creates an intense oxidizing environment which can produce electrons, negative molecular ions, radicals, ion radicals, ozone, and ultraviolet light. Corona discharge produces a chemically reactive non-equilibrium plasma at or near the surface of the particles of a reactive bed. The non-equilibrium plasma chemically reacts with the fluid as the fluid passes through the reactive bed. The electric field can be increased in strength to a level sufficient to produce ultraviolet light. Ultraviolet light is generated from corona "streamers" produced in the electric field. The ultraviolet light enhances chemical reactions and operates to stabilize corona discharge. When ultraviolet light is used for stimulating chemical reaction, it is preferred to also have particles that behave as catalysts in the presence of ultraviolet light, for example $TiO_2$ anatase.

It has been discovered that a non-equilibrium plasma having sufficient energy to efficiently and effectively chemically alter chemical constituents in a fluid stream can be made using electricity having frequencies less than 500 Hz. It is preferred to use standard frequency (50 to 60 Hz), standard voltage (90 to 130 volts) electrical sources. The electricity is then passed through a transformer. In a preferred embodiment, the transformer provides voltages from about 4,000 volts to about 35,000 volts with a current of from about 2 mA to about 20 mA. The leads from the transformer are connected to at least two electrodes in the reactive bed.

The electrodes may be arranged concentrically as in Birmingham et al. It is preferred to arrange the electrodes peripherally to avoid having an electrode exposed to the chemical alteration environment. At least two electrodes may be placed and spaced apart on the exterior perimeter of a particle bed. Improved uniformity of electrical field gradients within the particle bed may be achieved by using more than two electrodes, and multiple electrical phases. For example, use of six electrodes and six-phase electricity is preferred because of the more uniform electric field produced with this arrangement. However, one, two, three and other phases may be used along with any number of electrodes. For example, a single electrode in the form of a coil may be used.

An advantage of the present invention is that the particles contained in a reactive bed are self-cleaning. The plasma formed by the corona discharge reacts at or near the surface of the particles. This chemical reaction that alters the flowing fluid also cleans the particles themselves.

The particles may be fixed or fluid. An example of a fixed particle bed is found in Birmingham et al., herein incorporated by reference, wherein porous spherical, granular, or fibrous material is packed into a cylindrical tube. An example of a fluid particle bed is given in the present application in FIG. 1. The particles may be of any dielectric constant, but preferably have dielectric constants less than 33.

FIG. 1 shows a fluid bed reactor 10 in accordance with the present invention. Fluid bed reactor 10 has a housing 12 which includes a lower first chamber 14 and an upper second chamber 16. Housing 12 is preferably formed of glass, ceramic, or the like for the purpose of avoiding corrosion oxidation that may occur with metals. Lower chamber 14 and upper chamber 16 are substantially hollow and are in fluid communication with one another. Lower chamber 14 has a cross-sectional area smaller than the cross-sectional area of upper chamber 16. Preferably, lower chamber 14 and upper chamber 16 are cylindrical, although other shapes may be used.

Fluid bed reactor 10 has an inlet 20 adjacent and beneath lower chamber 14. Inlet 20 passes fluid (including liquids and gases) into chamber 14 of housing 12. Fluid bed reactor 10 also includes an outlet 22 formed in upper chamber 16. Outlet 22 passes fluid out of housing 12.

A recycle loop may be between upper chamber 16 and lower chamber 14 for controlling residence time and flow of fluid through lower chamber 14.

Fluid bed reactor 10 has a fluid bed of particles 18 contained within lower chamber 14. The particles may be formed of materials including but not limited to glass, ceramic, $SiO_2$, $MgO$, $Al_2O_3$, $TiO_2$, $BaTiO_3$, or even conductive materials. Most preferably, the particles are formed of $SiO_2$ or $TiO_2$. The particles employed in fluid bed 18 have a mass sufficient to be fluid or bubbling under the influence of the fluid passing into chamber 14 through inlet 20.

Fluid bed reactor 10 has a flow disperser 26 positioned between inlet 20 and lower chamber 14. Flow disperser 26 has a dual purpose. First, flow disperser 26 supports the bed of particles 18 within lower chamber 14. Second, flow disperser 26 evenly disperses the fluid from inlet 20 into lower chamber 14. Flow disperser 26 includes a disperser element 30 which functions as a floor to support the particles of fluid bed 18 in chamber 14. Disperser element 30 is permeable to the fluids being passed into lower chamber 14. Disperser element 30 further operates as a means to evenly disperse the fluid into lower chamber 14. Preferably, the disperser element 30 is formed of an inert, electrically insulating material including but not limited to glass and ceramic.

In a bubbling mode of operation, the fluid enters lower chamber 14 at a flow rate sufficient to carry the particles up from lower chamber 14 into upper chamber 16. The fluid loses velocity upon reaching upper chamber 16 due to the increased cross-sectional area of upper chamber 16. As a result, the particles carried by the fluid slow down and fall back into lower chamber 14. In this manner, the particles are in a constant state of flux.

Fluid bed reactor 10 includes an inner electrode 32 and an outer electrode 34. Inner electrode 32 extends along a longitudinal axis of housing 12. Outer electrode 34 is positioned outside of first chamber 14. Preferably, outer electrode 34 is an annular electrode encircling chamber 14.

A voltage is applied across electrodes 32 and 34 to create an electric field through lower chamber 14. Preferably, electrode 32 is coupled to a high voltage supply (not shown) and outer electrode 34 is grounded. The electric field has sufficient strength to highly energize the particles in fluid bed 18.

Preferably, the electric field is sufficient to create a volumetric corona discharge and subsequent non-equilibrium plasma among the particles in fluid bed 18 and throughout lower chamber 14.

One application for a fluid bed or fixed bed reactor is for off-gas treatment of gases produced during in situ heating or in situ vitrification of waste disposal sites deposited underground. Heating and vitrification processes cause the release of contaminated gases from the soil. These gases can be collected and passed through fluid bed reactor 10. Reactor 10 then chemically decomposes the contaminants into unharmful byproducts.

Other applications for a fluid reactor include but are not limited to treatment of automobile exhaust, furnace exhaust, for example biomass and fossil fuel combustors, and industrial exhausts.

An alternative method for chemically altering a fluid in accordance with an aspect of the present invention will now be described with reference to FIG. 2. A first fluid may be chemically altered into an oxidant, then the oxidized fluid is used to chemically alter a second fluid stream. The first fluid and the oxidants preferably comprise water and hydroxyl radicals, respectively.

Figure 2:
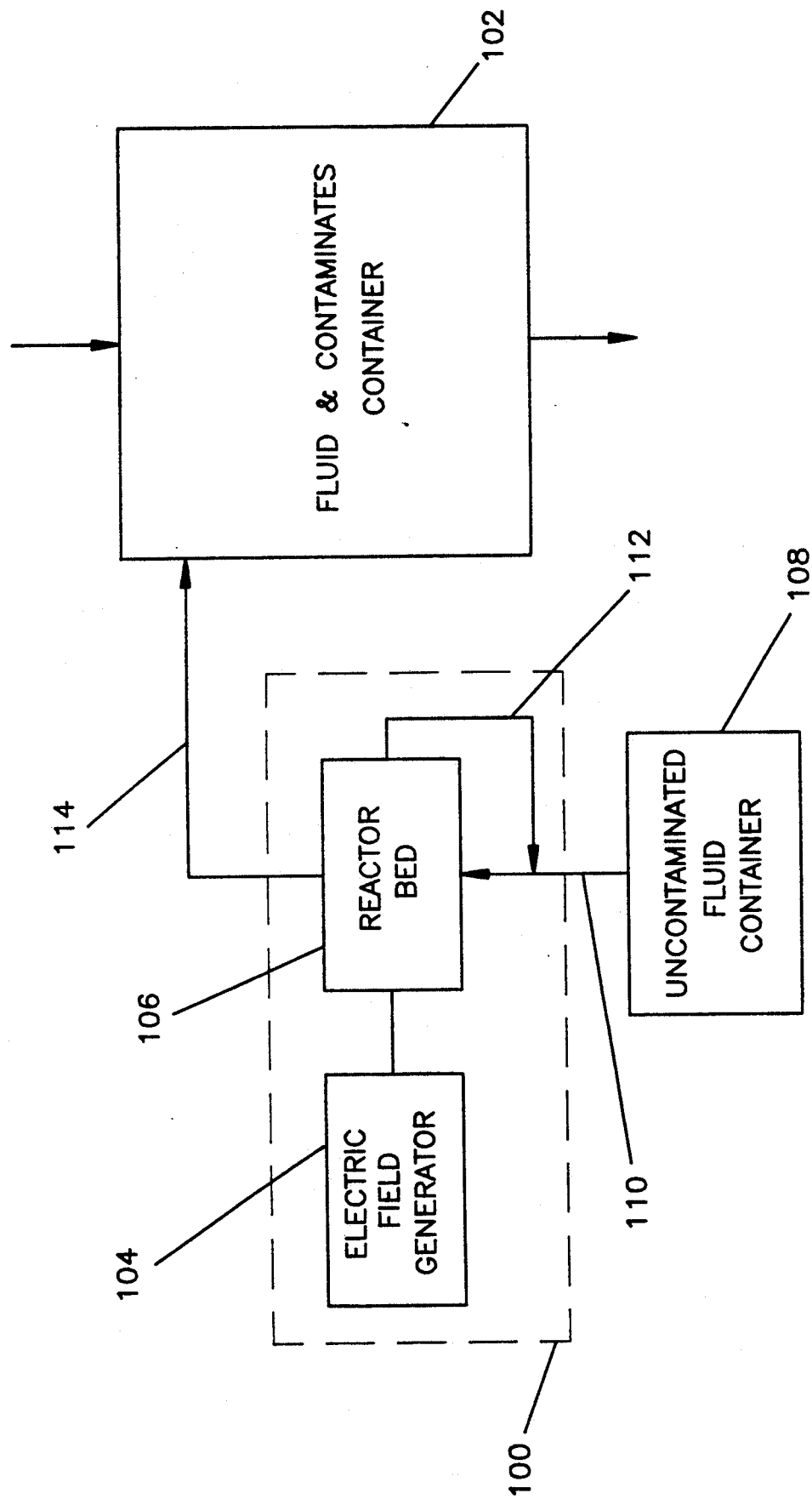
FIG. 2 is a diagrammatical illustration of one implementation of a continuous flow fluid reactor in accordance with the present invention.

In FIG. 2, fluid reactor 100 is connected to a fluid and contaminates container 102. Container 102 has adequate dimensions to store a very large volume of fluid in which some contaminants are present. The construction shown is advantageous in that the entire volume of slightly contaminated fluid does not need to be passed through fluid reactor 100. Instead, fluid reactor 100 injects chemically reactive material into container 102 to decompose the contaminants contained therein.

Fluid reactor 100 includes an electric field generator 104, reactor bed 106, and recycle loop 112. Fluid reactor 100 may be either of the fixed particle or fluid particle type as described above and is preferable of the fixed particle type. A fluid container 108 is connected in fluid communication to reactor bed 106. Container 108 holds fluid which may be a liquid, for example water, or a gas. When a liquid is used, it is preferred to trickle fluid through the bed 106. Trickling is distinguished from flooding in that flooding may provide a complete conductive path through the bed 106 whereas trickling preserves the resistance of the bed 106. Fluid is passed from container 108 into the reactor bed 106 through conduit 110. Electric field generator 104 creates an electric field through reactor bed 106. The electric field has a strength sufficient to create a volumetric corona discharge and subsequent non-equilibrium plasma among the particles in the reactor bed 106.

The corona discharge produces oxidants from the fluid, for example typically hydroxyl radicals when water is used as the fluid, as the fluid is passed through the reactor bed 106. The oxidants are injected from fluid bed 106 into the large fluid and contaminates container 102 through conduit 114. Once inside container 102, the oxidants scavenge, react with, and alter chemical constituents within the second fluid in container 102. According to the arrangement shown in FIG. 2, fluid reactor systems can be easily retrofit onto existing large volume containers. Fluids contained in the large volume containers are effectively altered without the necessity of passing the entire volume of fluid contained in the large volume container through the fluid reactor (100).

According to yet another aspect of the invention, an oxidizing environment is useful for oxygenating compounds, including but not limited to organic fuels. Oxygenation of organic fuels can produce compounds including but not limited to alcohols and ethers.

EXAMPLE 1

We conducted an experiment using apparatus and method of the present invention as described above for a fluid bed reactor utilizing an outer annular electrode (34) made of a stainless steel screen and an inner electrode (32) made of a stainless steel rod. Particle size ranged from approximately 45 to 90 microns. The flow rate of the fluid being passed into chamber 14 for these particle sizes was 1.4 scfm (standard cubic feet per minute). The cross-sectional area of lower chamber 14 was approximately 2.25 inch.

A corona detector was used to detect the presence of corona discharge within a fluid bed. It was found that corona discharge began at approximately 2,000 volts using 60 Hz frequency electricity. However, at this voltage level, corona discharge was not observed visually. The voltage was increased to approximately 26,000 volts before the corona was visible. At a voltage of 30,000 volts, sparking was observed. Several sparks were the length of the cylinder or about 60 cm in length. Sparks of this length in air would require an electric potential of at least 700,000 volts. Since the superimposed electric field was only 30,000 volts, the additional energy needed for sparking is postulated to have come from the random motion of the particles carried in the fluid bed. Whether by random motion or other physical phenomena, the fluid bed shows a surprising enhancement to the superimposed electric potential.

A gaseous stream of air containing 205 ppm of trichlorethylene (TCE) impurity was introduced into the fluid bed while the voltage was 30,000 volts. The effluent was analyzed and found to contain a reduced level of TCE of 103 ppm.

EXAMPLE 2

We conducted an experiment using apparatus and method of the present invention as described above for a fixed bed reactor utilizing an outer annular electrode (34) made of a stainless steel screen, and an inner electrode (32) made of a stainless steel rod. Particles were borosilicate glass having a size of 6 mm, with a fluid flow rate of 1.8 scfm.

A gaseous stream of air containing 2000 ppm of TCE impurity was introduced into the fluid bed while the voltage was 30,000 volts. The effluent was analyzed and found to contain a reduced level of TCE of 13 ppm.

EXAMPLE 3

Further tests were performed characterizing the behavior of the reactor. A Biddle Coronascope partial discharge detector was used to detect the presence of corona discharge within the reactor. With fixed particles present, corona discharge was present throughout the entire region between electrodes. Without particles, no corona was measured in the region between electrodes.

Figure 3:
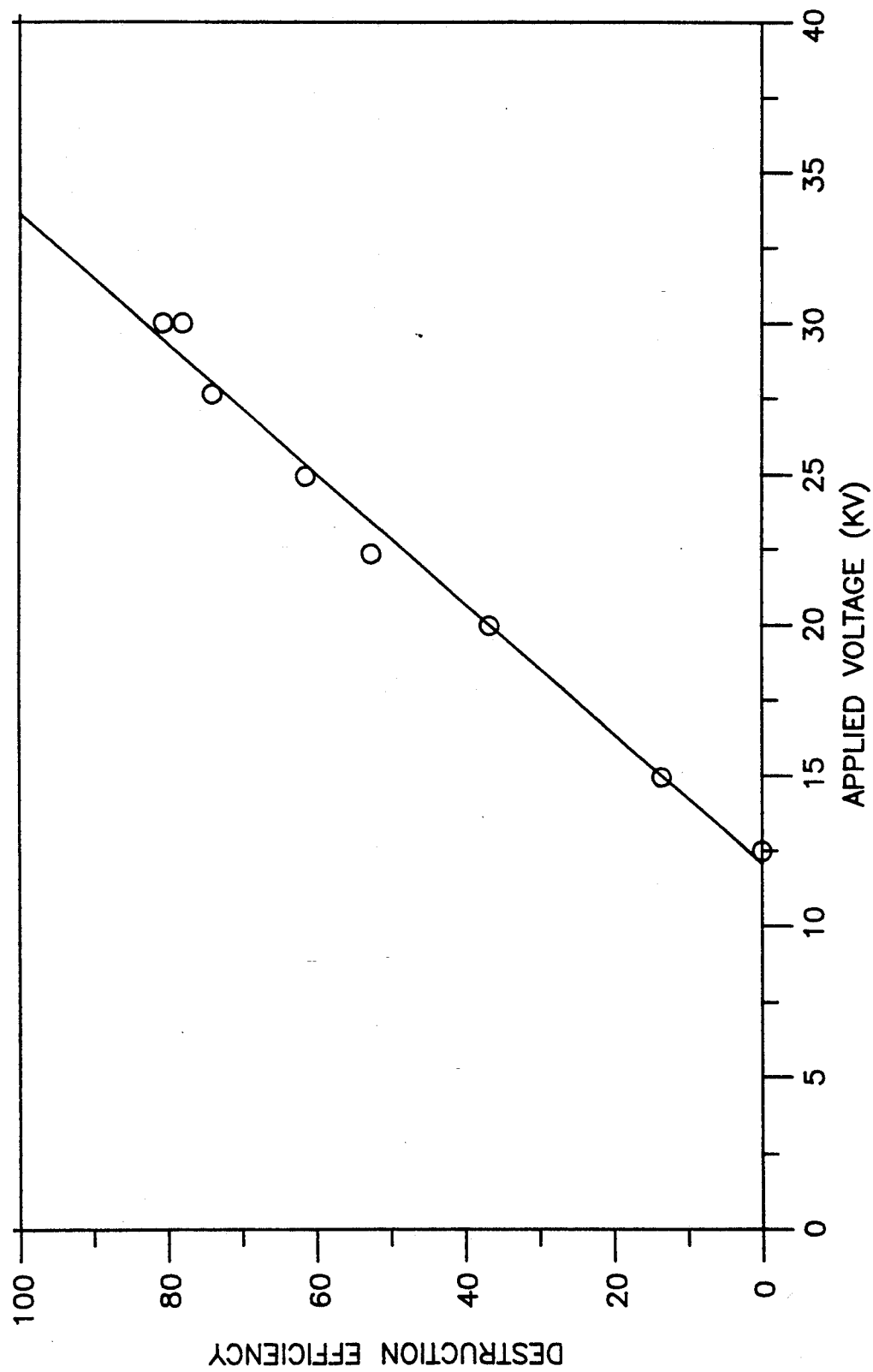
FIG. 3 is a graph of destruction efficiency versus applied voltage for the flow reactor of the present invention for a flow of 1.8 standard cubic feet per minute and inlet TCE concentration of 350 ppm.

A destruction efficiency defined as "one minus the ratio of the outlet concentration to the inlet concentration" was obtained for several tests at various voltages in a fixed bed reactor. Results are shown in FIG. 3 indicating a linear relationship between voltage and destruction efficiency.

Figure 4:
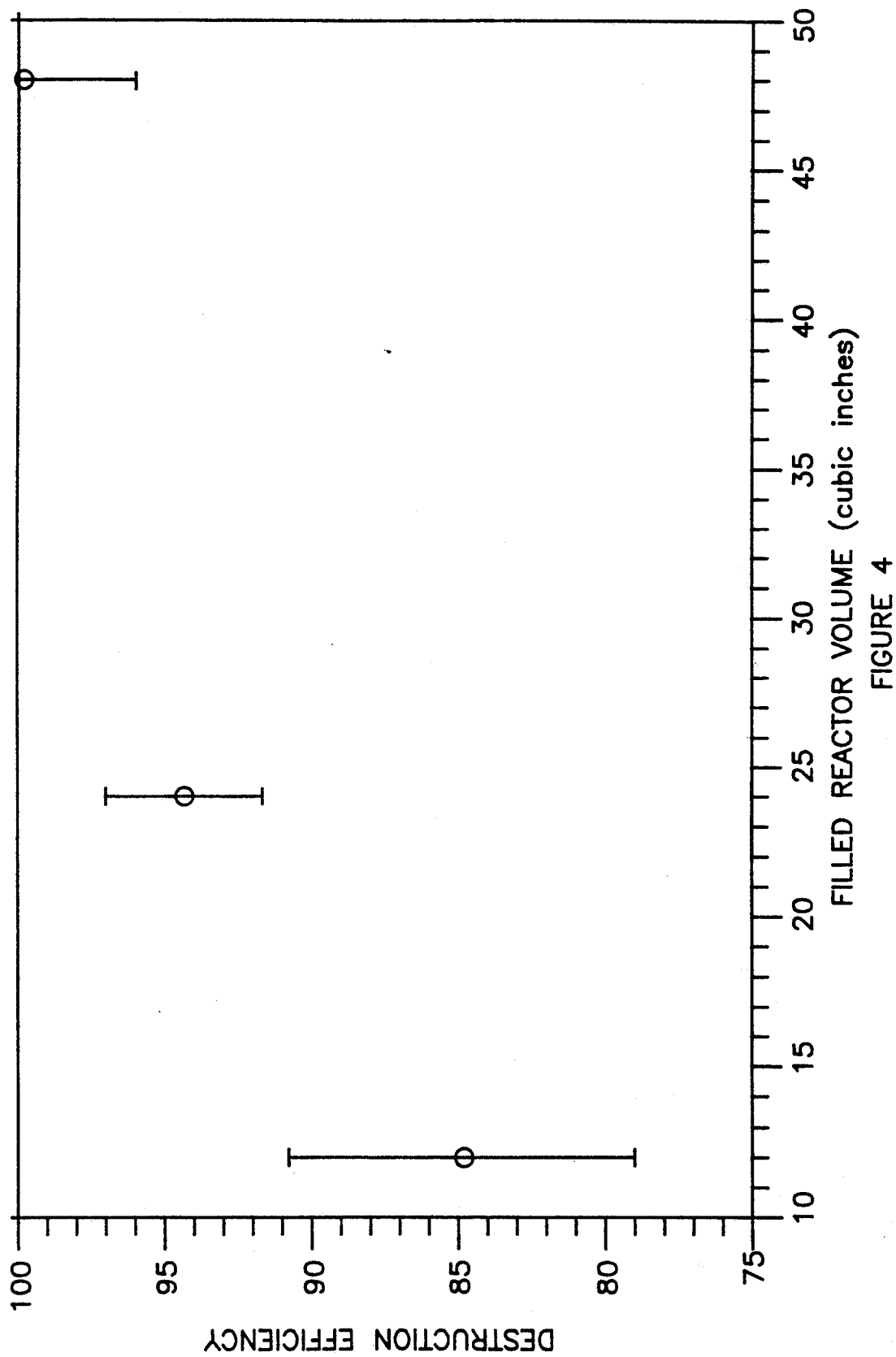
FIG. 4 is a graph of destruction efficiency versus filled reactor volume for the flow reactor of the present invention for a flow of 1.4 standard cubic feet per minute, 30 kV applied voltage and TCE concentration up to 1500 ppm.

Destruction efficiency was also observed for various volumes of particle material and illustrated in FIG. 4. It was demonstrated that increased number of particles increased destruction efficiency. Hence, for a given flow rate, destruction efficiency is increased by the addition of particles to the reactor.

Finally, different particles were used and the corona discharge observed. It was found that particles having dielectric constants greater than about 7 caused the corona to appear as a uniform violet hue. When particles of the same size but having dielectric constants less than about 7 are used, visible discharges or streamers are present.

The invention has been described in language more or less specific as to structural or methodical features. The invention is not, however, limited to the specific features described and shown, since the means herein disclosed comprise preferred forms of putting the invention into effect. The invention is therefore claimed in any of its forms or modifications within the proper scope of the appended claims.

We claim:

1. An apparatus for chemically altering fluids having, (a) means for applying an electrical potential across a bed of particles and creating a region of non-equilibrium plasma among said particles, and (b) means for passing said fluid through said region, wherein said fluids are chemically altered through contact with said non-equilibrium plasma, wherein the improvement comprises:

said means for applying said electrical potential having a ceramic housing with said particles therein and at least two electrodes with at least one outer electrode positioned outside said ceramic housing, whereby said housing is positioned between said particles and said at least one outer electrode;

said particles have a dielectric constant less than 33, and said electrical potential is applied with electricity having a frequency of less than 500 Hz.

2. An apparatus as recited in claim 1, wherein said electricity has a frequency from about 50 Hz to about 60 Hz.

3. An apparatus as recited in claim 1, wherein said particle bed is fixed.

4. An apparatus as recited in claim 1, wherein said particle bed is fluid.

5. An apparatus as recited in claim 1, wherein said particle bed is bubbling.

6. An apparatus as recited in claim 1, wherein said electrical potential is provided with two concentric electrodes.

7. An apparatus as recited in claim 1, wherein said electrical potential is provided with at least two electrodes spaced apart on an exterior perimeter of said particle bed.

8. An apparatus as recited in claim 7, having six electrodes and six electrical phases corresponding to each of the six electrodes.

9. An apparatus as recited in claim 1, wherein the fluid contains contaminants that are altered by the non-equilibrium plasma, thereby producing a clean effluent.

10. An apparatus as recited in claim 1, wherein the fluid is a fuel that is oxygenated by the non-equilibrium plasma.

11. An apparatus as recited in claim 1, wherein a first fluid is altered then mixed with a second fluid.

12. A method for chemically altering fluids having the steps of, (a) applying an electrical potential across a bed of particles and creating a region of non-equilibrium plasma among said particles, and (b) passing said fluid through said region, wherein said fluids are chemically altered through contact with said non-equilibrium plasma, wherein the improvement comprises the steps of:

providing a ceramic housing with said particles therein and at least two electrodes with at least one outer electrode positioned outside said ceramic housing, whereby said housing is positioned between said particles and said at least one outer electrode;

applying said electrical potential with electricity having a frequency of less than 500 Hz, and using particles having a dielectric constant less than 33.

13. A method as recited in claim 12, wherein said electricity has a frequency from about 50 Hz to about 60 Hz.

14. A method as recited in claim 12, wherein said particle bed is fixed.

15. A method as recited in claim 12, wherein said particle bed is fluid.

16. A method as recited in claim 12, wherein said particle bed is bubbling.

17. A method as recited in claim 12, wherein said electrical potential is provided with two concentric electrodes.

18. A method as recited in claim 12, wherein said electrical potential is provided with at least two electrodes spaced apart on an exterior perimeter of said particle bed.

19. A method as recited in claim 18, having six electrodes and six electrical phases corresponding to each of the six electrodes.

20. A method as recited in claim 12, wherein the fluid contains contaminants that are altered by the non-equilibrium plasma thereby producing a clean effluent.

21. A method as recited in claim 12, wherein the fluid is a fuel that is oxygenated by the non-equilibrium plasma.

22. A method as recited in claim 12, wherein a first fluid is altered then mixed with a second fluid.

* * * * *